(12) United States Patent
Gelmetti et al.

(10) Patent No.: US 8,453,960 B2
(45) Date of Patent: Jun. 4, 2013

(54) WIRE GUIDING SYSTEM

(75) Inventors: Carlo Gelmetti, Lazise (IT); Filippo Corradini, Isera (IT)

(73) Assignee: AWDS Technologies SRL (IT)

( * ) Notice: Subject to any disclaimer, the term of this patent is extended or adjusted under 35 U.S.C. 154(b) by 325 days.

(21) Appl. No.: 12/994,686

(22) PCT Filed: Feb. 24, 2009

(86) PCT No.: PCT/EP2009/001285
§ 371 (c)(1),
(2), (4) Date: Nov. 24, 2010

(87) PCT Pub. No.: WO2009/143917
PCT Pub. Date: Dec. 3, 2009

(65) Prior Publication Data
US 2011/0073703 A1     Mar. 31, 2011

(30) Foreign Application Priority Data

May 27, 2008    (EP) ..................................... 08009601

(51) Int. Cl.
    *B23K 9/133*      (2006.01)
    *B23K 9/12*       (2006.01)
    *B65H 57/14*      (2006.01)

(52) U.S. Cl.
    USPC .......................................... 242/615.2; 219/73

(58) Field of Classification Search
None
See application file for complete search history.

(56) References Cited

U.S. PATENT DOCUMENTS

| | | | |
|---|---|---|---|
| 318,062 A | 5/1885 | Warren | |
| 532,565 A | 1/1895 | Kilmer | |
| 617,353 A | 1/1899 | Redmond | |
| 627,722 A | 6/1899 | Edwards | |
| 932,808 A | 8/1909 | Pelton | |
| 1,276,117 A | 8/1918 | Riebe | 464/171 |
| 1,468,994 A | 9/1923 | Cook | 206/393 |
| 1,508,689 A | 9/1924 | Glasser | 219/124.03 |
| 1,640,368 A | 8/1927 | Obetz | |
| 1,907,051 A | 5/1933 | Emery | |

(Continued)

FOREIGN PATENT DOCUMENTS

| DE | 2525938 | 12/1976 |
|---|---|---|
| DE | EP1974846 | * 7/2007 |

(Continued)

OTHER PUBLICATIONS

International Search Report issued in Applicants' underlying PCT Application Serial No. PCT/EP09/001285 dated Feb. 24, 2009, 3 pgs.

(Continued)

*Primary Examiner* — Hoai V Ho
*Assistant Examiner* — James G Norman
(74) *Attorney, Agent, or Firm* — Hayes Soloway P.C.

(57) ABSTRACT

A wire guiding liner, in particular welding wire liner, has a plurality of roll holders which are displaceable with respect to each other, each roll holder holding a plurality of rolls. The angular displaceability of a roll holder with respect to the adjacent roll holder is limited such that when the wire is fed through the liner, it always touches exclusively on the rolls even when the liner is bent to its maximum curve, such that the wire while being inserted always hits the next roll at an angle that will push it towards and maintain it guided at the center of the liner.

21 Claims, 8 Drawing Sheets

U.S. PATENT DOCUMENTS

| | | | |
|---|---|---|---|
| 2,027,670 A | 1/1936 | Broeren | 312/62 |
| 2,027,674 A | 1/1936 | Broeren | 312/60 |
| 2,059,462 A | 11/1936 | Jungmann | |
| 2,329,369 A | 9/1943 | Haver | 285/11 |
| 2,407,746 A | 9/1946 | Johnson | |
| 2,457,910 A | 1/1949 | McLaren et al. | 74/501 |
| 2,477,059 A | 7/1949 | Hill | 242/137.1 |
| 2,483,760 A | 10/1949 | Duncan | 254/190 |
| 2,579,131 A | 12/1951 | Tinsley | 206/409 |
| 2,580,900 A | 1/1952 | Epstein | 206/409 |
| 2,679,571 A | 5/1954 | Chappel | 219/137.44 |
| 2,694,130 A | 11/1954 | Howard | 219/8 |
| 2,713,938 A | 7/1955 | Snyder | |
| 2,724,538 A | 11/1955 | Schweich | |
| 2,838,922 A | 6/1958 | Gift | 66/125 R |
| 2,849,195 A | 8/1958 | Richardson | |
| 2,864,565 A | 12/1958 | Whearly | 242/128 |
| 2,869,719 A | 1/1959 | Hubbard | |
| 2,880,305 A | 3/1959 | Baird | |
| 2,911,166 A | 11/1959 | Haugwitz | 242/128 |
| 2,929,576 A | 3/1960 | Henning | |
| 2,966,258 A | 12/1960 | Krafft | |
| 2,974,850 A | 3/1961 | Mayer | |
| 2,984,596 A | 5/1961 | Franer | 206/412 |
| 3,022,415 A | 2/1962 | Francois | 219/137.44 |
| 3,096,951 A | 7/1963 | Jenson | 242/137.1 |
| 3,108,180 A | 10/1963 | Linnander | 219/137.44 |
| 3,119,042 A | 1/1964 | Bond | |
| 3,185,185 A | 5/1965 | Pfund | |
| 3,244,347 A | 4/1966 | Jenk | |
| 3,274,850 A | 9/1966 | Tascio | 74/501 |
| 3,283,121 A | 11/1966 | Bernard et al. | 219/137.44 |
| 3,344,682 A | 10/1967 | Bratz | 74/501 |
| 3,352,412 A | 11/1967 | Draving et al. | 206/59 |
| 3,433,504 A | 3/1969 | Hanes | 285/93 |
| 3,463,416 A | 8/1969 | Quenot | 242/396.9 |
| 3,478,435 A | 11/1969 | Cook | |
| 3,491,876 A | 1/1970 | Zecchin | |
| 3,512,635 A | 5/1970 | Lang | |
| 3,536,888 A | 10/1970 | Borneman | 219/137.43 |
| 3,565,129 A | 2/1971 | Field | |
| 3,567,900 A | 3/1971 | Nelson | |
| 3,576,966 A | 5/1971 | Sullivan | |
| 3,595,277 A | 7/1971 | Lefever | |
| 3,648,920 A | 3/1972 | Stump | |
| 3,690,567 A | 9/1972 | Borneman | 239/591 |
| 3,724,249 A | 4/1973 | Asbeck et al. | |
| 3,729,092 A | 4/1973 | Marcell | |
| 3,730,136 A | 5/1973 | Okada | 118/78 |
| 3,799,215 A | 3/1974 | Willems | |
| 3,815,842 A | 6/1974 | Scrogin | 242/423.1 |
| 3,823,894 A | 7/1974 | Frederick et al. | 242/137.1 |
| 3,939,978 A | 2/1976 | Thomaswick | 206/454 |
| 4,000,797 A | 1/1977 | Ducanis | 193/38 |
| 4,043,331 A | 8/1977 | Martin et al. | 128/156 |
| 4,044,583 A | 8/1977 | Kinney, Jr. | |
| 4,074,105 A | 2/1978 | Minehisa et al. | |
| 4,097,004 A | 6/1978 | Reese | 242/129 |
| 4,102,483 A | 7/1978 | Ueyama et al. | |
| 4,113,795 A | 9/1978 | Izawa et al. | 524/84 |
| 4,127,590 A | 11/1978 | Endo et al. | 260/346.74 |
| 4,157,436 A | 6/1979 | Endo et al. | 528/167 |
| 4,161,248 A | 7/1979 | Kalmanovitch | 206/389 |
| 4,172,375 A | 10/1979 | Rushforth et al. | |
| 4,188,526 A | 2/1980 | Asano | |
| 4,222,535 A | 9/1980 | Hosbein | 242/128 |
| 4,254,322 A | 3/1981 | Asano | |
| 4,274,607 A | 6/1981 | Priest | 242/163 |
| 4,280,951 A | 7/1981 | Saito et al. | 524/118 |
| 4,293,103 A | 10/1981 | Tsukamoto | |
| 4,354,487 A | 10/1982 | Oczkowski et al. | 604/366 |
| 4,392,606 A | 7/1983 | Fremion | 206/600 |
| 4,396,797 A | 8/1983 | Sakuragi et al. | 174/68 |
| 4,429,001 A | 1/1984 | Kolpin et al. | 442/340 |
| 4,451,014 A | 5/1984 | Kitt et al. | 242/128 |
| 4,464,919 A | 8/1984 | Labbe | |
| 4,500,315 A | 2/1985 | Pieniak et al. | 604/379 |
| 4,540,225 A | 9/1985 | Johnson et al. | 339/16 RC |
| 4,546,631 A | 10/1985 | Eisinger | |
| 4,575,612 A | 3/1986 | Prunier | 219/137.43 |
| 4,582,198 A | 4/1986 | Ditton | |
| 4,585,487 A | 4/1986 | Destree et al. | |
| 4,623,063 A | 11/1986 | Balkin | |
| 4,737,567 A | 4/1988 | Matsumoto et al. | 528/167 |
| 4,742,088 A | 5/1988 | Kim | 521/118 |
| 4,826,497 A | 5/1989 | Marcus et al. | 604/359 |
| 4,855,179 A | 8/1989 | Bourland et al. | 442/409 |
| 4,869,367 A | 9/1989 | Kawasaki et al. | 206/409 |
| 4,891,493 A | 1/1990 | Sato et al. | |
| 4,916,282 A | 4/1990 | Chamming et al. | 219/69.2 |
| 4,918,286 A | 4/1990 | Boyer | 219/137.44 |
| 4,949,567 A | 8/1990 | Corbin | |
| 4,974,789 A | 12/1990 | Milburn | 242/159 |
| 5,051,539 A | 9/1991 | Leathers-Wiessner | |
| 5,061,259 A | 10/1991 | Goldman et al. | 604/368 |
| 5,078,269 A | 1/1992 | Dekko et al. | |
| 5,100,397 A | 3/1992 | Poccia et al. | 604/365 |
| 5,105,943 A | 4/1992 | Lesko et al. | |
| 5,109,983 A | 5/1992 | Malone et al. | |
| 5,147,646 A | 9/1992 | Graham | 424/424 |
| 5,201,419 A | 4/1993 | Hayes | 206/409 |
| 5,205,412 A | 4/1993 | Krieg | |
| 5,215,338 A | 6/1993 | Kimura et al. | 285/166 |
| 5,227,314 A | 7/1993 | Brown et al. | |
| 5,261,625 A | 11/1993 | Lanoue | 242/129.8 |
| 5,277,314 A | 1/1994 | Cooper et al. | 206/398 |
| 5,314,111 A | 5/1994 | Takaku et al. | |
| 5,368,245 A | 11/1994 | Fore | 242/171 |
| 5,372,269 A | 12/1994 | Sutton et al. | |
| 5,452,841 A | 9/1995 | Sibata et al. | |
| 5,485,968 A | 1/1996 | Fujioka | 242/172 |
| 5,494,160 A | 2/1996 | Gelmetti | 206/395 |
| 5,530,088 A | 6/1996 | Sheen et al. | 528/287 |
| 5,553,810 A | 9/1996 | Bobeczko | |
| 5,562,646 A | 10/1996 | Goldman et al. | 604/368 |
| 3,284,608 A | 11/1996 | McDonald | 219/137.43 |
| 5,585,013 A | 12/1996 | Truty | 219/69.12 |
| 5,586,733 A | 12/1996 | Miura et al. | 242/125.2 |
| 5,590,848 A | 1/1997 | Shore et al. | |
| 5,629,377 A | 5/1997 | Burgert et al. | 524/832 |
| 5,665,801 A | 9/1997 | Chang et al. | 524/125 |
| 5,692,700 A | 12/1997 | Bobeczko | |
| 5,714,156 A | 2/1998 | Schmidt et al. | 424/404 |
| 5,738,209 A | 4/1998 | Burr et al. | 206/397 |
| 5,739,704 A | 4/1998 | Clark | |
| 5,746,380 A | 5/1998 | Chung | |
| 5,816,466 A | 10/1998 | Seufer | |
| 5,819,934 A | 10/1998 | Cooper | |
| 5,845,862 A | 12/1998 | Cipriani | 242/423.1 |
| 5,847,184 A | 12/1998 | Kleiner | 558/73 |
| 5,865,051 A | 2/1999 | Otzen et al. | |
| 5,921,391 A | 7/1999 | Ortiz et al. | 206/397 |
| 5,931,408 A | 8/1999 | Ishii et al. | 242/580 |
| 5,971,308 A | 10/1999 | Boulton | |
| 5,988,370 A | 11/1999 | Roemer et al. | 206/215 |
| 5,990,377 A | 11/1999 | Chen et al. | 604/381 |
| 6,016,911 A | 1/2000 | Chen | 200/395 |
| 6,019,303 A | 2/2000 | Cooper | |
| 6,103,358 A | 8/2000 | Bruggermann et al. | 428/317.9 |
| 6,159,591 A | 12/2000 | Beihoffer et al. | 428/327 |
| 6,237,768 B1 | 5/2001 | Cipriani | |
| 6,245,880 B1 | 6/2001 | Takeuchi et al. | 528/287 |
| 6,255,371 B1 | 7/2001 | Schlosser et al. | 524/100 |
| 6,260,781 B1 | 7/2001 | Cooper | |
| 6,301,944 B1 | 10/2001 | Offer | |
| 6,322,016 B1 | 11/2001 | Jacobsson et al. | |
| 6,340,522 B1 | 1/2002 | Burke et al. | |
| 6,408,888 B1 | 6/2002 | Baumer et al. | 138/120 |
| 6,417,425 B1 | 7/2002 | Whitmore et al. | 604/367 |
| 6,425,549 B1 | 7/2002 | Bae et al. | 242/580 |
| 6,464,077 B1 | 10/2002 | Liu | |
| 6,481,892 B1 | 11/2002 | Agostini | 384/43 |
| 6,498,227 B1 | 12/2002 | Horie | 528/176 |
| 6,524,010 B1 | 2/2003 | Derman | 384/513 |
| 6,547,176 B1 | 4/2003 | Blain et al. | 242/423.1 |
| 6,564,943 B2 | 5/2003 | Barton et al. | 206/395 |
| 6,613,848 B1 | 9/2003 | Wang et al. | 525/481 |

| | | |
|---|---|---|
| 6,636,776 B1 | 10/2003 | Barton et al. |
| 6,648,141 B2 | 11/2003 | Land |
| 6,649,870 B1 | 11/2003 | Barton et al. |
| 6,708,864 B2 | 3/2004 | Ferguson, III et al. |
| 6,715,608 B1 | 4/2004 | Moore ............... 206/397 |
| 6,745,899 B1 | 6/2004 | Barton |
| 6,750,262 B1 | 6/2004 | Hahnle et al. ............... 521/64 |
| 6,753,454 B1 | 6/2004 | Smith et al. ............... 602/41 |
| 6,821,454 B2 | 11/2004 | Visca et al. |
| 6,831,142 B2 | 12/2004 | Mertens et al. ............ 526/328.5 |
| 6,872,275 B2 | 3/2005 | Ko et al. ............... 156/181 |
| 6,889,835 B2 | 5/2005 | Land ............... 206/408 |
| 6,913,145 B2 | 7/2005 | Barton ............... 206/409 |
| 6,938,767 B2 | 9/2005 | Gelmetti ............... 206/408 |
| 6,977,357 B2 | 12/2005 | Hsu et al. |
| 7,108,916 B2 | 9/2006 | Ehrnsperger et al. ......... 428/403 |
| 7,147,176 B2 | 12/2006 | Rexhaj |
| 7,152,735 B2 | 12/2006 | Dragoo et al. |
| 7,156,334 B1 | 1/2007 | Fore et al. ............... 242/171 |
| 7,178,755 B2 | 2/2007 | Hsu et al. ............... 242/423.1 |
| 7,198,152 B2 | 4/2007 | Barton et al. |
| 7,220,942 B2 | 5/2007 | Barton et al. |
| 7,309,038 B2 | 12/2007 | Carroscia ............... 206/409 |
| 7,410,111 B2 | 8/2008 | Carroscia |
| 7,441,657 B2 | 10/2008 | Gelmetti ............... 206/393 |
| 7,441,721 B2 | 10/2008 | Bae et al. ............... 242/128 |
| 7,533,906 B2 | 5/2009 | Luettgen et al. ............ 285/146.1 |
| 7,563,840 B2 | 7/2009 | Ye ............... 524/449 |
| 7,950,523 B2 | 5/2011 | Gelmetti ............... 206/408 |
| 8,207,475 B2 | 6/2012 | Minato et al. ............ 219/137.31 |
| 8,235,210 B2 | 8/2012 | De Lacerda et al. ........... 206/393 |
| 2001/0014706 A1 | 8/2001 | Sprenger et al. ............ 523/400 |
| 2002/0000391 A1 | 1/2002 | Kawasai et al. ............... 206/408 |
| 2002/0003014 A1 | 1/2002 | Homma |
| 2002/0014477 A1 | 2/2002 | Lee et al. |
| 2002/0039869 A1 | 4/2002 | Achille ............... 442/417 |
| 2002/0120178 A1 | 8/2002 | Tartaglia et al. ............ 600/114 |
| 2003/0042162 A1 | 3/2003 | Land ............... 206/408 |
| 2003/0042163 A1 | 3/2003 | Cipriant |
| 2003/0052030 A1 | 3/2003 | Gelmetti ............... 206/397 |
| 2003/0184086 A1 | 10/2003 | Christianson ............ 285/146.1 |
| 2004/0020041 A1 | 2/2004 | Ferguson, III et al. |
| 2004/0050441 A1 | 3/2004 | Roschi ............... 138/120 |
| 2004/0133176 A1 | 7/2004 | Muthiah et al. ............... 604/368 |
| 2004/0155090 A1 | 8/2004 | B.-Jensen |
| 2004/0176557 A1 | 9/2004 | Mertens et al. ............ 526/328.5 |
| 2004/0186244 A1 | 9/2004 | Hatsuda et al. ............... 525/451 |
| 2004/0201117 A1 | 10/2004 | Anderson ............... 264/4.3 |
| 2004/0241333 A1 | 12/2004 | Cielenski et al. ............ 427/421.1 |
| 2004/0265387 A1 | 12/2004 | Hermeling et al. ............ 424/486 |
| 2005/0008776 A1 | 1/2005 | Chhabra et al. ............... 427/180 |
| 2005/0261461 A1 | 11/2005 | Maeda et al. ............... 528/272 |
| 2006/0027699 A1 | 2/2006 | Bae et al. |
| 2006/0074154 A1 | 4/2006 | Harashina et al. ............ 524/115 |
| 2006/0155254 A1 | 7/2006 | Sanz et al. ............... 604/378 |
| 2006/0247343 A1 | 11/2006 | Kishimoto et al. ............ 524/117 |
| 2006/0258824 A1 | 11/2006 | Oshima et al. ............... 525/533 |
| 2006/0278747 A1 | 12/2006 | Carroscia |
| 2007/0175786 A1 | 8/2007 | Nicklas |
| 2007/0272573 A1 | 11/2007 | Gelmetti |
| 2007/0284354 A1 | 12/2007 | Laymon ............... 219/137.51 |
| 2008/0156925 A1 | 7/2008 | Cooper ............... 242/559.3 |
| 2008/0257875 A1 | 10/2008 | De Keizer ............... 219/137.44 |
| 2008/0300349 A1 | 12/2008 | Fuchikami et al. ............ 524/117 |
| 2008/0314876 A1 | 12/2008 | Pinsonneault et al. ............ 219/74 |
| 2009/0014572 A1 | 1/2009 | Weissbrod et al. |
| 2009/0014579 A1 | 1/2009 | Bender et al. |
| 2009/0200284 A1 | 8/2009 | Sanchez ............... 219/137.51 |
| 2010/0116803 A1 | 5/2010 | Gelmetti ............... 219/138 |
| 2011/0073703 A1 | 3/2011 | Gelmetti et al. ............ 242/615.2 |
| 2011/0094911 A1 | 4/2011 | Gelmetti ............... 206/408 |
| 2011/0114523 A1 | 5/2011 | Gelmetti ............... 206/407 |
| 2011/0114617 A1 | 5/2011 | Gelmetti et al. ............ 219/137.9 |
| 2011/0132880 A1 | 6/2011 | Kossowan ............... 219/76.14 |

FOREIGN PATENT DOCUMENTS

| | | |
|---|---|---|
| EP | 1974846 | 10/2008 |
| IT | EP1974846 | * 10/2008 |
| WO | 2006091075 | 8/2006 |
| WO | 2007010171 | 1/2007 |
| WO | WO2007010171 | * 1/2007 |

OTHER PUBLICATIONS

Office Action issued for related U.S. Appl. No. 12/618,250, dated Apr. 26, 2012 (11 pgs).
EPO Office Action issued for related application No. 09753572.8, dated May 2, 2012 (5 pgs).
International Preliminary Report on Patentability issued for related application No. PCT/EP2009/001285, dated Nov. 30, 2010 (7 pgs).

* cited by examiner

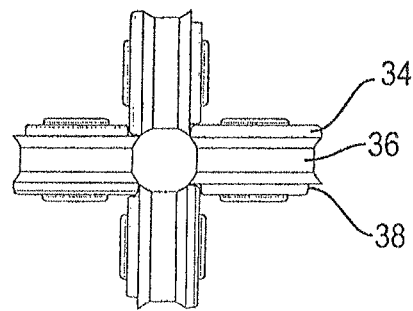
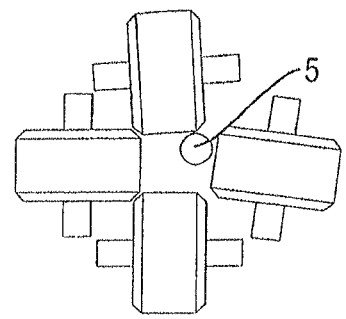
Fig. 3a
Fig. 3b
PRIOR ART
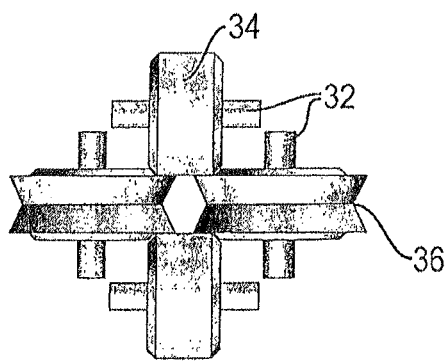
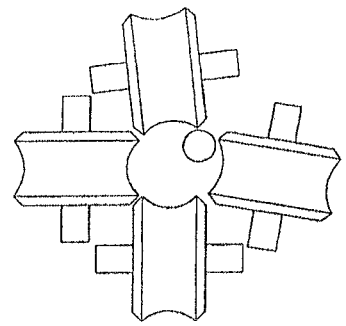
Fig. 4a
Fig. 4b
PRIOR ART

WIRE GUIDING SYSTEM

BACKGROUND OF THE INVENTION

The invention relates to a system for guiding wire, in particular welding wire.

A welding wire guide is used to supply welding wire from a wire feeder to a welding torch. Usually, a closed metal tube is used, comparable to the sheath of a Bowden cable. Such liner is flexible and has a small diameter, allowing it to be mounted on a welding torch. Another advantage is that the welding wire can be easily pushed through the liner from the feeder towards the torch without the risk that the front end of the wire gets stuck somewhere in the middle. However, significant friction occurs when the welding wire is moved through the liner during use. As a consequence, the conventional liner after it has been in use for some time becomes clogged with lubricant and metal particles with considerable wire feeding and welding problems and be replaced frequently, resulting in significant down-time of the respective welding robot and unwanted interruptions of production.

SUMMARY OF THE INVENTION

The object of the invention is to provide a liner or guide which can be used for supplying welding wire to a welding torch, but generates significantly less friction and allows the welding wire to be pushed through from the feeder towards the welding torch.

This object is achieved with a wire guiding liner, in particular welding wire liner, having a plurality of roll holders which are displaceable with respect to each other, each roll holder holding a plurality of rolls, wherein the angular displaceability of a roll holder with respect to the adjacent roll holder is limited such that when the wire is fed through the liner, it always touches exclusively on the rolls even when the liner is bent to its maximum curve, such that the wire while being inserted always hits the next roll at an angle that will push it towards and maintain it guided at the centre of the liner. The rolls ensure that there is small friction only, when the welding wire is moved through the liner. The limited angular displaceability of the roll holders with respect to each other ensures that the front end of the welding wire can be pushed easily through the liner without there being the risk that it gets stuck somewhere in the liner. In addition, such liner can be formed with a small diameter, in particular as no outer tube or liner is necessary. In prior art wire guiding systems, a tube is necessary which acts as a straightener so as to prevent excessive bending which would make the guiding system inoperable. Having a liner which does not have an outer tube has a diameter which is so small that it can be installed in a cable hose.

According to a preferred embodiment, a roll holder is connected to the adjacent roll holder by a defined pivot axis. The defined pivot axis where adjacent roll holders are connected to each other forms of a swiveling joint which ensures that there is no bending, stretching or compressing of the material of the liner when the roll holders are displaced with respect to each other, resulting in increased lifetime. This further reduces the risk that the roll holders break after being subjected to UV radiation associated with welding. If the material of the liner is subjected to bending stress when being moved, the material becoming brittle due to UV radiation results in breakage. This is avoided with the design according to the invention, as the swivel joints allow the liner to be moved without the material being subjected to bending loads.

The swiveling joint can be formed by two pivot pins on one side of a roll holder and two pin accommodation openings on the other side of the roll holder. Accordingly, the liner is formed from a chain of roll holders connected to each other by the pin/opening connections.

According to another embodiment, the roll holder is formed from a ring which holds the rolls, a plurality of rings being assembled to form a long flexible tube with the rolls inside. The rings can be held together by an outer tube which tightly holds the rings in succession.

According to another embodiment, a roll holder is connected to the adjacent roll holder by an elastic portion. The elastic portion can be formed integrally with the individual roll holders or can be attached thereto.

According to another embodiment, the roll holder is formed from two parts between which the rolls are held, the first part of one roll holder being elastically connected to the second part of the adjacent roll holder. This embodiment uses roll holders formed from two different materials. As an example, the elastic connection is made from a rubber portion formed to the roll holder. According to another example, the elastic connection is formed as a metal spring. It is also possible to form the elastic connection as a bayonet type locking connection.

According to a preferred embodiment, the rolls in the roll holder overlap in an axial direction. This prevents that the welding wire gets pinched in the corner of two adjacent rolls when pressing into the corner between them.

According to a preferred embodiment, two pairs of rolls are used, the rolls of one pair being arranged opposite each other, the rolls of the first pair having a straight outer contour and the rolls of the second pair having a central portion with reduced diameter. This configuration results in the welding wire being pushed towards the reduced diameter portion of the second pair, preventing the wire from trying to push the rolls apart when being pressed into the corner between adjacent rolls.

According to another preferred embodiment, four identical rolls are used, each roll having a straight outer contour at one axial end and a shoulder at the opposite axial end. As identical rolls are used, a reduced number of different parts are necessary for manufacturing the liner, resulting in reduced costs.

Preferably, each roll has a central portion with reduced diameter. Here again, the wire is guided towards the center of the respective roll and therefore away from the corner between two adjacent rolls.

The rolls can be made from a plastics material, from metal or from a ceramic material, depending from the particular requirements.

According to a preferred embodiment, the roll holders are made from a material which is resistant to UV radiation. This allows using the liner without an external tube or protection which hitherto was necessary for plastic wire guides, as the UV radiation produced during welding made the material become brittle within a short time period.

Preferably, the roll holders, when angularly displaced with respect to each other, abut at each other before the rolls of one roll holder contact the rolls of the adjacent roll holder. This ensures that the rolls cannot block each other, guaranteeing low friction even if the liner is bent to a maximum (curved so as to have the shortest radius).

According to a preferred embodiment, the liner consists of a plurality of identical roll holders having identical sets of rolls. This keeps the manufacturing costs down as only a limited number of different parts are necessary for producing the liner.

According to a preferred embodiment, the welding wire can be inserted and fed in both directions. This allows the liner to be installed without taking care of a particular orientation, thus preventing incorrect installation.

According to a preferred embodiment, each roll holder has a small protrusion on one axial end which extends into the adjacent roll holder such that the wire is protected against dirt. This ensures that the welding wire is held completely protected in the interior of the liner so that dirt cannot accumulate on its surface. Therefore, no external sheath or cover is necessary for the liner.

According to a preferred embodiment, the roll holder consists of two portions with the rolls being held between the portions, the portions being held together when the respective roll holder is connected to the adjacent roll holder. This reduces that amount of work involved with mounting the rolls to the roll holders.

According to a preferred embodiment, one of the roll holders has a clip connection allowing it to grasp a conventional metal guide. This allows attaching the new liner to a conventional system.

BRIEF DESCRIPTION OF THE DRAWINGS

The invention will now be described with reference to various embodiments which are shown in the enclosed drawings. In the drawings.

FIGS. 3a and 3b show rolls as used with the wire guide according to the first embodiment and according to the prior art;

FIGS. 4a and 4b show rolls as used with the wire guide according a variant to the first embodiment and according to the prior art;

DETAILED DESCRIPTION OF THE INVENTION

Figure 1A:
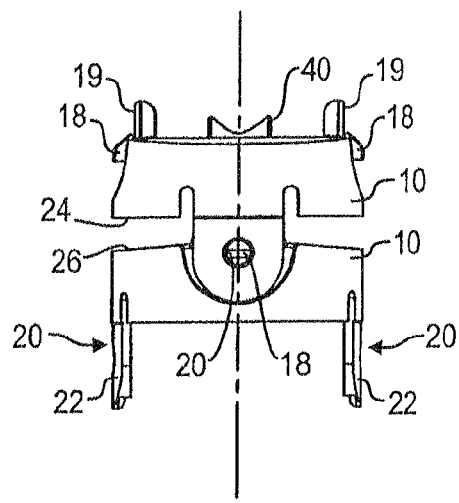
FIGS. 1a to 1f show a first embodiment of a wire guide according to the invention.

In FIG. 1, a first embodiment of the invention is shown. The wire guide is to guide a welding wire 5 and consists of a plurality of individual roll holders 10 which each comprise a body 12 and an insert 14.

The body has, seen in an axial direction, two pivot pins 18 at one side, and two pivot pin accommodation openings 20 at the other side. The openings 20 are formed in holding lugs 22, and the pins protrude from guiding surfaces 19. Both the pins and the openings are arranged diametrically opposite each other. In other words, both pins are arranged on one and the same diameter, and the two openings are arranged also on one diameter, with the diameter at which the pins are arranged expending perpendicularly with respect to the diameter at which the openings are arranged.

Figure 1B:
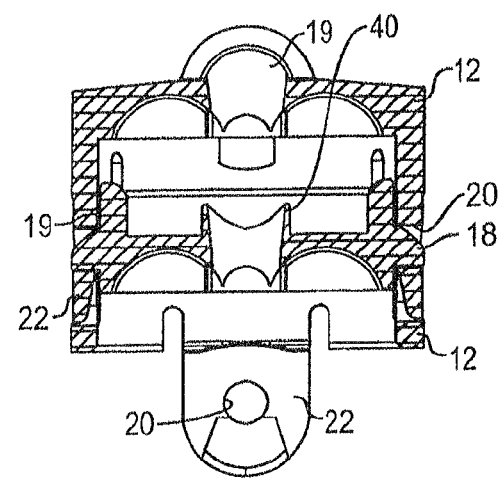
Figure 1E:
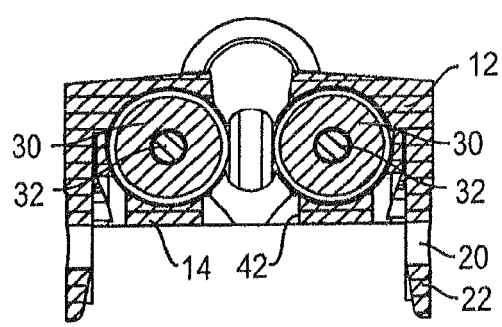

As can be seen in FIG. 1b, the holding lugs 22 are supported by the guiding surfaces 19 when the pins 18 of a first roll holder 10 engage in the openings 20 of an adjacent roll holder 10. Each pin is provided with a chamfered edge which allows it to be pushed between the holding lugs 22 of the adjacent roll holder and to snap into the opening 20.

Each roll holder holds four rolls 30 which can freely rotate about their respective axis of rotation. The axis of rotation is defined by short bearing pins 32 which can be formed separately or integrally with the respective roll. The bearing pins are held between the respective body 12 and the corresponding insert 14, with the insert being placed loosely in the body (please see FIG. 1e). It is the next roll holder 10 connected to the previous roll holder which results in the insert being held fixed in the body.

Figure 1F:
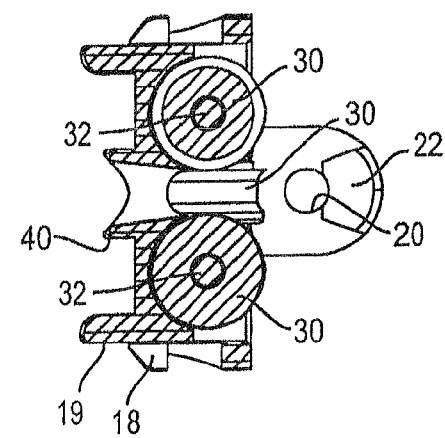
Figure 1C:
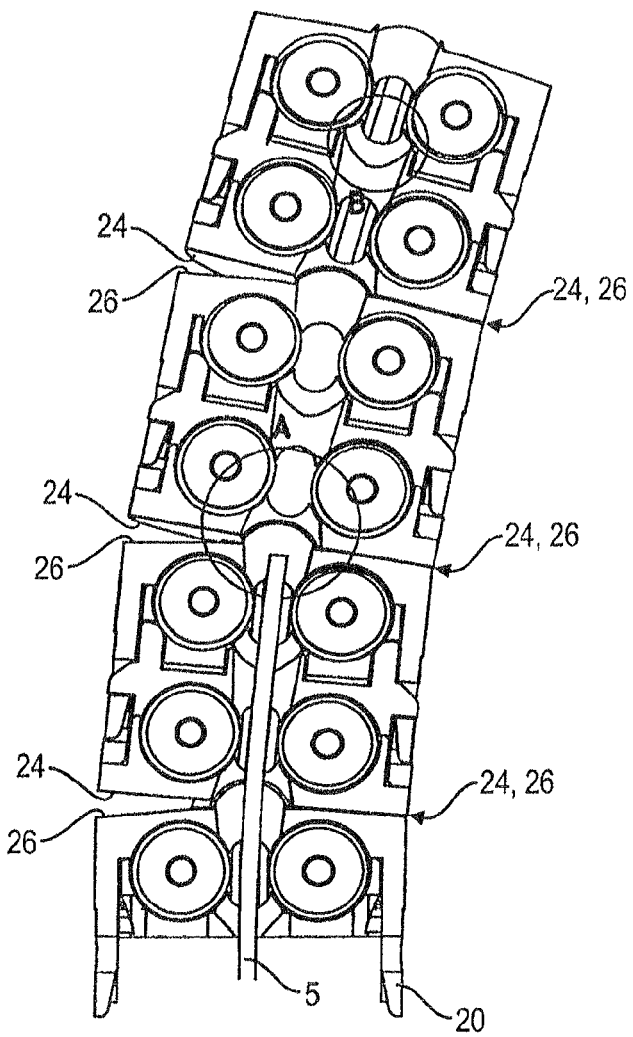

As can be seen in FIG. 1f, each insert is provided a small protrusion 40 on the axial end which has the pins 18. The protrusion 40 extends into a recess 42 the adjacent roll holder such that the wire is protected against dirt; there is no direct access to a wire guided in the liner so that no external cover against dirt is necessary. As can be seen in FIG. 1c, each protrusion has a curved outer contour, the center of curvature of each protrusion coinciding with the pivot axis defined by pin 18 and opening 20. Recess 42 is curved so as to smoothly lie opposite the outer contour of the respective protrusion 40.

Figure 1D:
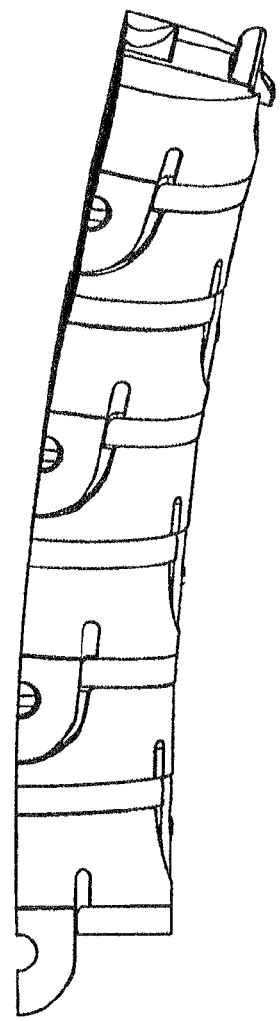

FIG. 1d shows that the liner has a smooth outer contour formed by the peripheral cylindrical surfaces of the roll holders arranged in close succession.

As can be seen in FIG. 3a, each roll 30 has a straight outer contour 34 at one axial end, a central portion 36 with reduced diameter, and a shoulder 38 at the other axial end. The reduced diameter portion 36 merges into the axial end portions with oblique transitional portions. The rolls are arranged such that each roll overlaps in an axial direction with the adjacent roll. Here, each portion 34 with straight outer contour engages into the shoulder of the adjacent roll. This results in there being no direction in which a wire could push into a slot between two rolls. The difference to the prior art is obvious when looking at FIG. 3b, which shows conventional rolls.

An alternative configuration of the rolls is shown in FIG. 4a. Here, two pairs of rolls are used, namely a first pair of opposite rolls having a straight outer contour 34, and a second pair of opposite rolls having a reduced diameter central portion 36 (having a V-shape). Here again, the rolls are arranged such that they overlap. This again prevents that the rolls can be pushed apart by a wire being pressed towards the slot between adjacent rolls (please compare to FIG. 4b which shows conventional rolls).

The pins 18 together with the openings 20 define a defined axis of displacement or a swivel joint between adjacent roll holders 10, with the axis of displacement on the front side of a roll holder being perpendicular to the axis of displacement on the rear side of the roll holder. The dimensions of the bodies 12, in particular the distance between the pins and the openings as viewed in an axial direction, are such that the angular displacement of the roll holders with respect to each other is limited. As soon as the predefined angular displacement is reached, stop surfaces 24, 26 on the roll holders abut each other so that no further displacement is possible (please see FIGS. 1c and 1d). In particular, the angular displacement is limited such that when the wire is fed through the liner, it always touches exclusively on the rolls even when the liner is bent to its maximum curve, such that the wire while being inserted always hits the next roll at an angle that will push it towards and maintain it guided at the centre of the liner. This is obvious when comparing FIG. 2a showing a liner fulfilling this criteria, with FIG. 2b showing a conventional liner used for guiding welding wire from a container to a welding robot.

Figure 2A:
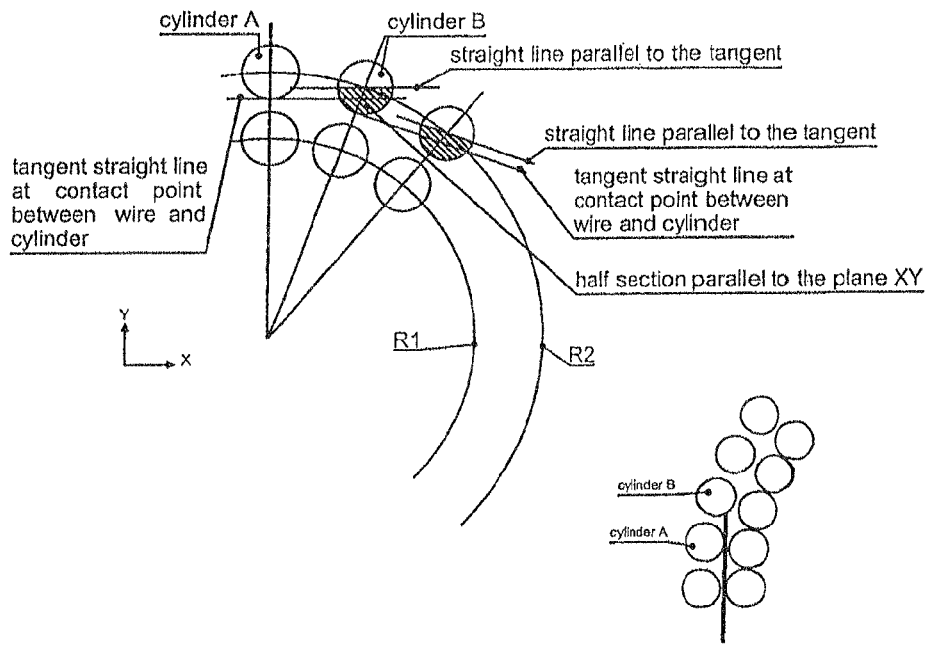
FIGS. 2a and 2b show a schematic representation of a wire guide allowing the welding wire to be pushed through, and a wire guide in which the welding wire gets stuck when being pushed into it.
Figure 2B:
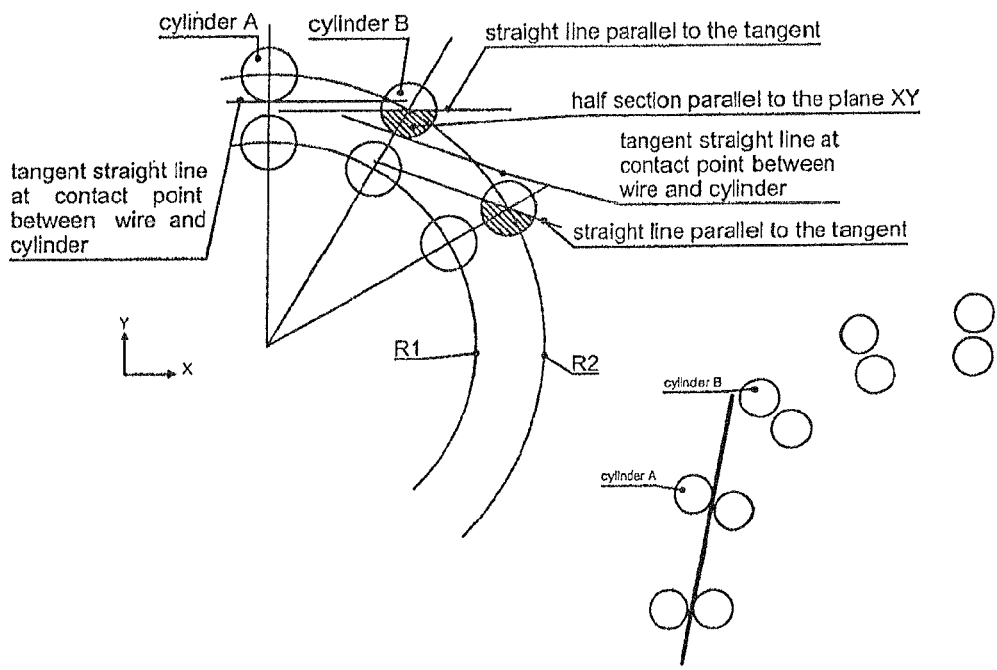

As can be seen from FIG. 2a, the front end of a welding wire pushed into the wire guide always touches the rolls of the "next" roll holder on its inner side such that it is pushed towards the center of the wire guide. If the angular displaceability of adjacent roll holders is however not limited enough, the front end of a wire pushed into the guide abuts somewhere on the roll holder outside the rolls, and therefore gets stuck. It cannot be fed into the liner.

Looking at FIGS. 2a and 2b, this will be explained in more detail.

- Given two circumferences having respectively a radius R1 and R2, with R1<R2;
- Given two series of cylinders disposed with their axes along the circumferences R1 and R2 paired in radial direction;
- A (welding) wire 5 passes through the space delimited between the two series of cylinders and the path of such wire is tangent to the generatrix of each cylinder;
- Considering two contiguous cylinders A and B both placed on the circumference of the radius R2;
- The wire trajectory within the space delimited by the two circumferences of cylinders can only be achieved when the straight line tangent to the point of contact between (welding) wire and the cylinder A passes through the section of the next cylinder B (parallel to the lying plane of the circumference);
- Such section of the cylinder B is defined by a straight line passing through the centre of the cylinder B and parallel to the tangent (regardless of its direction) of the cylinder A;
- Necessary and sufficient condition for the correct wire trajectory (thus avoiding the use of a guiding funnel) is that the straight line tangent to the cylinder A is placed between the centre of the circumferences and its parallel straight line passing through the centre of the cylinder B.

As a result of this geometry, the front end of a wire inserted into the liner will always touch a roll on its inner half, thereby being guided towards the liner center.

Even if the liner is held curved to the maximum extent, the rolls of one roll holder cannot touch the rolls of the adjacent roll holder. This ensures that the rolls can always easily turn so that friction is kept low.

The roll holders 10 are preferably made from a plastic material, in particular from Polyamide which is resistant to UV radiation. On the one hand, this allows to injection mould the roll holders so that low manufacturing costs are achieved. On the other hand, the resistance to UV radiation allows to use the guide without an external cover or sheath which in the prior art is necessary to protect liners against the UV radiation occurring during welding. The rolls 30 and the bearing pins 32 can be formed from plastics in order to reduce manufacturing costs, from metal in order to withstand high loads and temperatures, or from a ceramics material in order to reduce friction.

In FIGS. 5a to 5e, a second embodiment is shown. Here, the comments given above regarding the maximum allowable angular displaceability of the roll holders with respect to each other and with respect to the arrangement of the rolls, also apply. In the second embodiment, each roll holder is disk-shaped and formed from two parts between which the rolls are held, the first part of one roll holder being elastically connected to the second part of the adjacent roll holder by an elastic connecting portion 54 formed integrally with parts 50, 52. As an alternative, connecting portion 54 could be formed from a material different from the material of portions 50, 52, for example by 2-components injection molding. It could also be formed as a rubber insert.

Figure 5A:
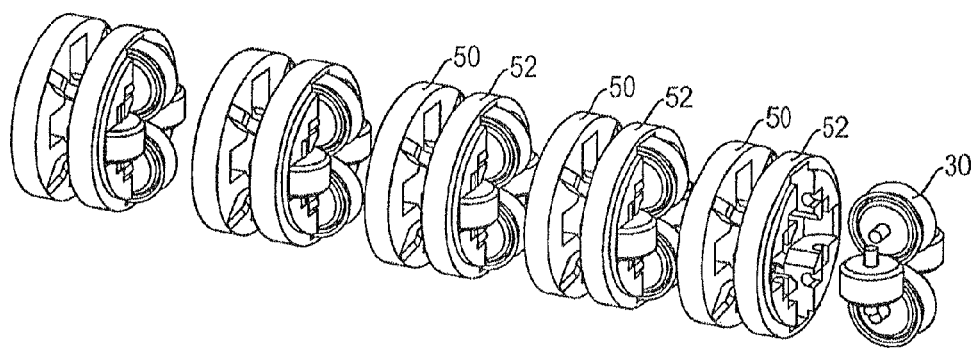
FIGS. 5a to 5e show a second embodiment of a wire guide according to the invention.
Figure 5B:
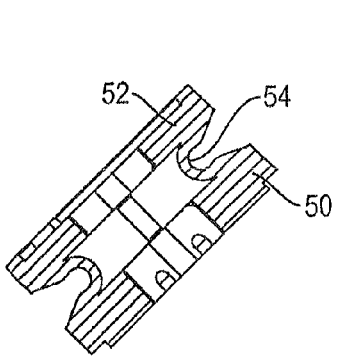
Figure 5C:
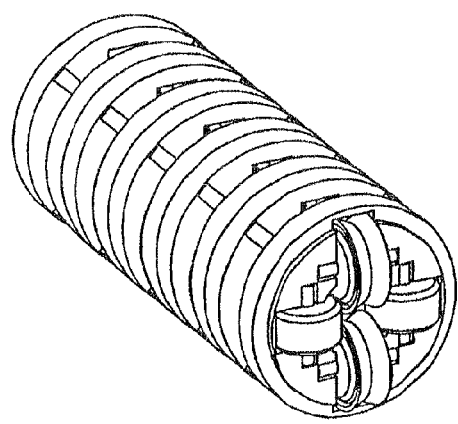
Figure 5D:
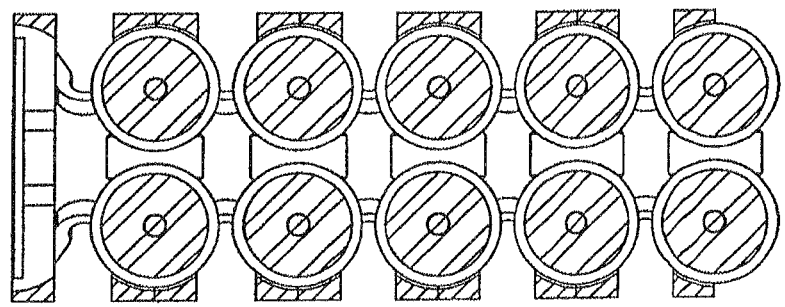
Figure 5E:
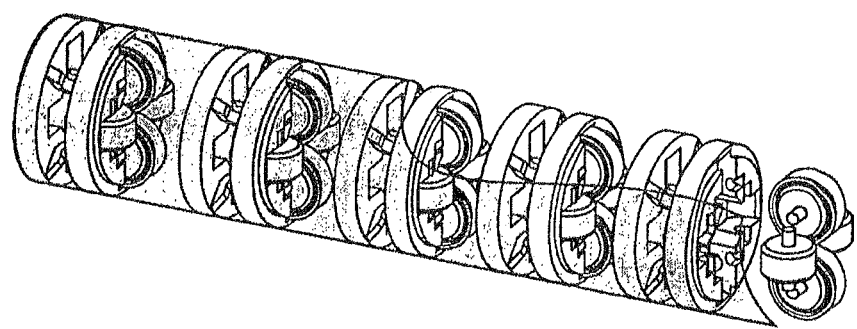

It is important to understand that the rolls 30 are held between portions 52, 50 which are not connected via connecting portion 54. In other words, onto part 52 of a respective roll holder, equipped with the rolls, is placed part 50 of the adjacent roll holder, whereby rolls 30 are trapped between parts 52 and 50. Repeating this process results in a liner as shown in FIGS. 5c and 5d.

Figure 6A:
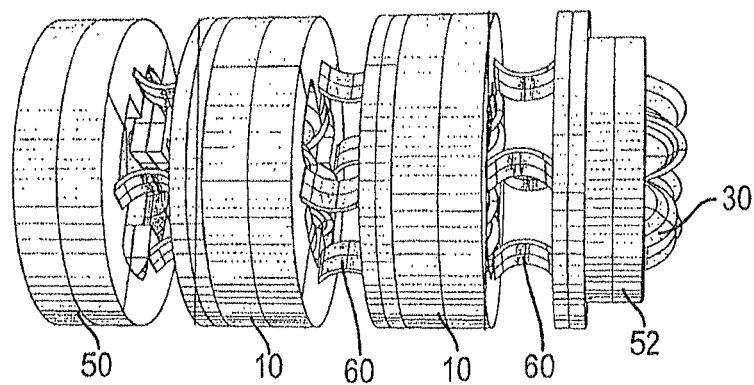
FIGS. 6a to 6c show a third embodiment of a wire guide according to the invention.
Figure 6B:
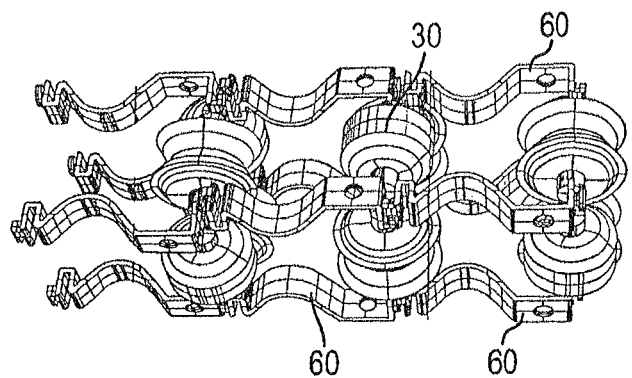
Figure 6C:
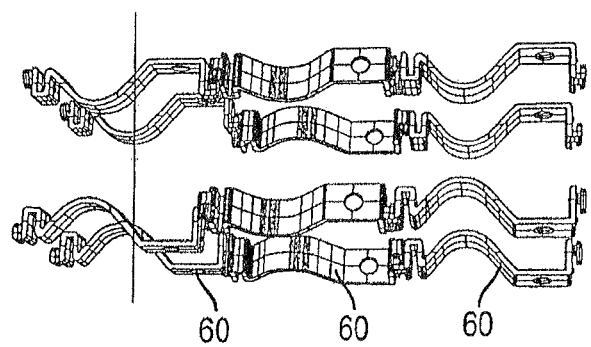

In FIGS. 6a to 6c, a third embodiment is shown. It is based on the second embodiment, which connecting portions 54 of the second embodiment being replaced by metal springs 60 which are molded into parts 50, 52 forming roll holders 10.

The roll holders of both the second and the third embodiment are finally arranged in the interior of a tube or like sheath in order to prevent the welding wire from picking up dirt.

Figure 7A:
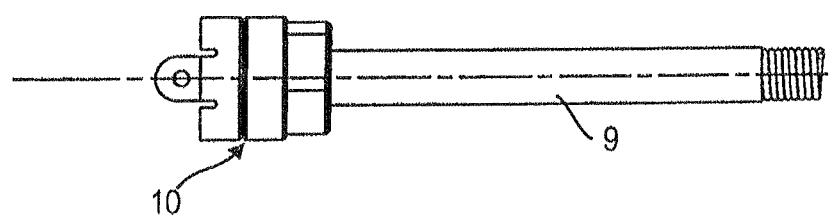
FIGS. 7a and 7b show an additional feature of the wire guide according to the invention.
Figure 7B:
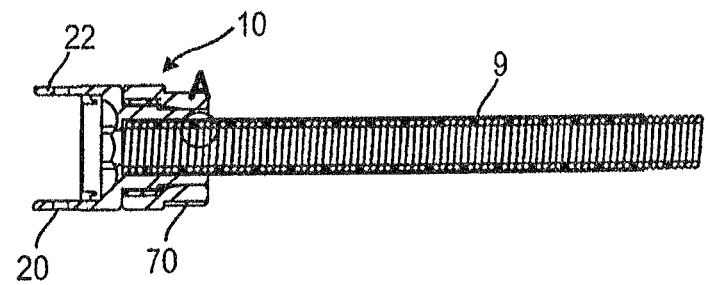

In FIGS. 7a and 7b, an additional feature is shown which can be used with the first and/or last roll holder of the welding wire guide. The respective roll holder is provided with a clip connection 70 allowing to clamp a short portion of a conventional metal wire guide 9. This allows to fit the new liner to conventional systems.

In summary, basic idea is to form a liner comparable to a flexible hose with small diameter, having in its interior a plurality of rolling elements close to one another. This provides for small friction while at the same time guaranteeing that the wire, even if the liner is bent, does not touch any supporting parts but is guided only by means of the rolling elements. The liner works bi-directional, which is an advantage over the prior art systems.

The invention claimed is:

1. A wire guiding liner, in particular welding wire liner, having a plurality of roll holders which are displaceable with respect to each other, each roll holder holding a plurality of rolls, wherein an angular displaceability of a roll holder with respect to an adjacent roll holder is limited such that when the wire is fed through the liner, it always touches exclusively on the rolls even when the liner is bent to its maximum curve, such that the wire while being inserted always hits the next roll at an angle that will push it towards and maintain it guided at the centre of the liner.

2. The wire guiding liner of claim 1 wherein a roll holder is connected to the adjacent roll holder by a defined pivot axis.

3. The wire guiding liner of claim 2 wherein the roll holder has two pivot pins on one side and two pin accommodation openings on the other side, forming the pivot axis.

4. The wire guiding liner of claim 1 wherein the roll holder is formed from a ring which holds the rolls, a plurality of rings being assembled to form a long flexible tube with the rolls inside.

5. The wire guiding liner of claim 1 wherein a roll holder is connected to the adjacent roll holder by an elastic portion.

6. The wire guiding liner of claim 1 wherein the roll holder is formed from two parts between which the rolls are held, the first part of one roll holder being elastically connected to the second part of the adjacent roll holder.

7. The wire guiding liner of claim 6 wherein the elastic connection is made from a rubber portion formed to the roll holder.

8. The wire guiding liner of claim 6 wherein the elastic connection is formed as a metal spring.

9. The wire guiding liner of claim 6 wherein the elastic connection is formed as a bayonet type locking connection.

10. The wire guiding liner according to claim 1 wherein the rolls in the roll holder overlap in an axial direction.

11. The wire guiding liner according to claim 1 wherein two pairs of rolls are used in each roll holder, the rolls of one pair being arranged opposite each other, the rolls of the first pair having a straight outer contour and the rolls of the second pair having a central portion with reduced diameter.

12. The wire guiding liner according to claim 1 wherein four identical rolls are used in each roll holder, each roll having a straight outer contour at one axial end and a shoulder at the opposite axial end.

13. The wire guiding liner according to claim 12 wherein each roll has a central portion with reduced diameter.

14. The wire guiding liner according to claim 1 wherein the rolls are made from a plastics material, from metal or from a ceramic material.

15. The wire guiding liner according to claim 1 wherein the roll holders are made from a material which is resistant to UV radiation.

16. The wire guiding liner according to claim 1 wherein the roll holders, when angularly displaced with respect to each other, abut at each other before the rolls of on roll holder contact the rolls of the adjacent roll holder.

17. The wire guiding liner according to claim 1 wherein the liner consists of a plurality of identical roll holders having identical sets of rolls.

18. The wire guiding liner according to claim 1 wherein the welding wire can be inserted and fed in both directions.

19. The wire guiding liner according to claim 1 wherein each roll holder has a small protrusion on one axial end which extends into the adjacent roll holder such that the wire is protected against dirt.

20. The wire guiding liner according to claim 1 wherein the roll holder consists of two portions with the rolls being held between the portions, the portions being held together when the adjacent roll holder is connected to said roll holder.

21. The wire guiding liner according to claim 1 wherein one of the roll holders has a clip connection allowing it to grasp a conventional metal guide.

* * * * *